United States Patent [19]

Copelin

[11] 4,306,058

[45] Dec. 15, 1981

[54] METHOD FOR REDUCING OLIGOMERIC CYCLIC ETHER CONTENT OF A POLYMERIZATE

[75] Inventor: Harry B. Copelin, Wilmington, Del.

[73] Assignee: E. I. Du Pont de Nemours and Company, Wilmington, Del.

[21] Appl. No.: 208,422

[22] Filed: Nov. 19, 1980

[51] Int. Cl.$^3$ .................. B01D 3/24; C10G 21/14
[52] U.S. Cl. .................................. 528/498; 203/49
[58] Field of Search .............. 528/417, 481, 483, 497, 528/498, 501, 502; 568/579; 203/49

[56] References Cited

U.S. PATENT DOCUMENTS

| | | | |
|---|---|---|---|
| 3,202,605 | 7/1965 | Redcay | 208/309 |
| 3,806,619 | 4/1974 | Zosel | 426/478 |
| 3,969,196 | 7/1976 | Zosel | 203/49 |
| 4,202,964 | 5/1980 | Pruckmayr et al. | 528/482 |

FOREIGN PATENT DOCUMENTS 1474207  5/1977  United Kingdom .

Primary Examiner—Frank Sever

[57] ABSTRACT

The oligomeric cyclic ether content of a tetrahydrofuran-, an alkylene oxide- or a tetrahydrofuran/alkylene oxide polymerizate can be reduced by bringing the polymerizate into contact with a gas in the supercritical state.

10 Claims, No Drawings

METHOD FOR REDUCING OLIGOMERIC CYCLIC ETHER CONTENT OF A POLYMERIZATE

DESCRIPTION

1. Technical Field

This invention relates to a method for reducing the oligomeric cyclic ether (OCE) content of a tetrahydrofuran (THF)-, an alkylene oxide (AO)- or a THF/AO polymerizate. It is more particularly directed to a method whereby the OCE content of such a polymerizate can be reduced by bringing it into contact with a gas in the supercritical state.

2. Background and Summary of the Invention

Homopolymers of THF and of alkylene oxides, and copolymers of THF and alkylene oxides, are known and can be used as soft segment glycols in the preparation of polyurethanes. Processes disclosed in the art for producing such polymers, like that illustrated in British Pat. No. 854,958, also produce OCE byproducts, which may constitute as much as 7–15%, by weight, of a polymerizate.

The presence of these oligomeric cyclic ethers in a polymerizate can be undesirable for several reasons. First, the ethers are nonfunctional impurities and can represent an economic penalty to a purchaser of a polymerizate because up to 7–15%, by weight, of the material purchased contains no reactive hydroxyl groups and may therefore be useless for the purposes intended. Secondly, when such a polymerizate is used in preparing a polyurethane, the ethers tend to degrade the polyurethane's properties. This degradation manifests itself in much the same way as that encountered when an excess of plasticizer is used: the lower molecular weight oligomeric cyclic ethers vaporize slowly at elevated temperatures and are leached out by water and common organic liquids, which results in weight loss and undesirable dimensional changes in the polyurethane product.

The need therefore exists for a simple, inexpensive method for reducing the OCE content of a THF-, an AO- or a THF/AO polymerizate. This need is filled by the process of the invention, whereby the OCE content of such a polymerizate is reduced by removing the cyclic ethers with a gas which is under supercritical conditions of temperature and pressure.

DETAILED DESCRIPTION OF THE INVENTION

The gas used in the process of the invention can be any having a critical temperature of 0°–200° C., preferably 9°–155° C. The gas can be, for example, a saturated- or unsaturated monoethylenically unsaturated hydrocarbon, a halogenated hydrocarbon, carbon dioxide, dimethyl ether or diethyl ether. Ethylene and propylene are preferred.

The polymerizate whose OCE content is reduced according to the invention can be any of those produced by known methods of preparing THF homopolymers, AO homopolymers or THF/AO copolymers. Illustrative of such methods are those shown in U.S. Pat. No. 3,425,999 to Axelrood and Lajiness and U.S. Pat. No. 4,071,492 to Bethea and Futamura. The disclosures of these documents are incorporated into this application to show how such polymerizates are prepared.

"Alkylene oxide", as used herein, means a compound containing up to three carbon atoms in its alkylene oxide ring. The alkylene oxide can be unsubstituted or substituted with, for example, alkyl or aryl groups or halogen atoms. Illustrative of such alkylene oxides are ethylene oxide, 1,2-propylene oxide, 1,3-propylene oxide, 1,2-butylene oxide, 1,3-butylene oxide, 2,2-bis-chloromethyl-1,3-propylene oxide and epichlorohydrin. The polymerizates most commonly processed according to the invention are THF/ethylene oxide polymerizates and THF/1,2-propylene oxide polymerizates.

The crude polymerizate is used in the form from which most of the unreacted monomers have been removed, only insignificant amounts remaining. This is ordinarily done by distillation, using conventional techniques.

The polymerizate usually contains about 7–15%, by weight, of the ethers, and in some cases may contain as much as 15–18%.

As used herein, "oligomeric cyclic ether" means a compound having a calculated molecular weight of no more than about 500 and containing two or more of the following units linked together:

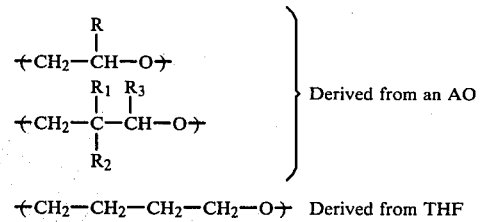

$+CH_2-CH_2-CH_2-CH_2-O+$ Derived from THF where R, $R_1$, $R_2$ and $R_3$ are hydrogen, methyl, ethyl or halomethyl.

Illustrative of such oligomeric cyclic ethers are those represented in the following table:

| Composition Number Ratio of AO Units to THF Units | |
|---|---|
| 2:1 | 1:4 |
| 1:2 | 3:3 |
| 3:1 | 5:2 |
| 2:2 | 2:4 |
| 4:1 | 4:3 |
| 1:3 | 6:2 |
| 3:2 | 3:4 |
| 5:1 | 5:3 |
| 2:3 | 2:5 |
| 4:2 | 4:4 |

The process of the invention is conducted by bringing the gas, in the supercritical state, into intimate contact with the polymerizate, as by bubbling or sparging the gas through the polymerizate contained in a pressure vessel. For efficiency, it is preferred that the gas be no more than about 50° C. above its critical temperature, preferably no more than 20° C. above.

The volume of gas used, and its flow rate through the polymerizate, are a matter of choice. The faster the gas is passed through the polymerizate, and the larger the volume of gas per volume of polymerizate, the quicker the extraction and the larger the volume of oligomeric cyclic ethers removed.

After the gas has passed through the polymerizate, it is withdrawn from the vessel and is released from the supercritical state by dropping the pressure. It is not necessary to drop the pressure of the gas to atmospheric; pressure need be lowered only to the point at which the solubility of the oligomeric cyclic ethers in the gas is low enough for the ethers to be released in the form of droplets, as is well-known. The droplets can be condensed, and collected or discarded as one wishes.

The cyclic ethers, while undesirable in the polymerizate, are useful materials in their own right, and can be used as phase transfer catalysts and as metal complexing agents, as shown by C. J. Pedersen in J. Amer. Chem. Soc., 89, 7017 (1967). The process of the invention can therefore also be looked upon as the last stage or purification step in the production of such ethers.

The process can be performed batchwise, as described, or continuously. In the continuous mode, gas in the supercritical state is continuously bubbled or sparged through the polymerizate which is being fed continuously into a pressure vessel. The gas containing the oligomeric cyclic ethers is then continuously withdrawn from the vessel through a coil in which gas pressure is dropped. The ether droplets are condensed in the coil and can be collected in a suitable container. The gas can be recycled if desired.

As is also well-known, the process can be performed continuously in stages, e.g., in a tower, where the gas in the supercritical state is fed into the bottom of the tower and flows up, and the polymerizate is introduced at the top of the tower and flows down.

The efficiency and selectivity of the process can be enhanced by using an entrainer, which acts to increase the solubility of the cyclic ethers in the gas, or to decrease the solubility of the polymerizate in the gas, or both.

The entrainer can be any organic liquid having a boiling point of 35°–200° C., and which is miscible with the polymerizate. Illustrative of liquids which can be used are aromatic hydrocarbons, ether alcohols, diethyl ether, THF, dioxane and diethylene glycol dimethyl ether (diglyme).

The entrainer is used at a concentration of about 5–75%, by weight, of the polymerizate. The entrainer can be added directly to the polymerizate before the process is begun, or it can be introduced into the pressure vessel with the gas stream.

Inevitably, some of the entrainer condenses with the cyclic ethers when the gas is released from supercriticality. The amount can be minimized by keeping the gas pressure as high as possible during this stage of the process. The entrainer retained in the gas, and that collected with the cyclic ethers can, of course, be recycled.

By using the variations just described, one can reduce the OCE content of a polymerizate to any desired level, even one which stands on the threshold of detection.

OCE content is determined by programmed gas chromatography, using a stainless steel column having a length of 3.045 meters (10 feet) and an outside diameter of 3.175 mm ($\frac{1}{8}$ inch), packed with 5%, by weight, of "OV-101", a methyl silicone oil sold by Supelco, Inc., supported on 100–120 U.S.S. mesh "Chromsorb G", sold by Hewlett-Packard, Inc. The column is in an oven whose temperature is programmed to rise from 70°–300° C. at the rate of 30° C. per minute with a 12 minute hold time at 300° C. before the cycle is repeated. The column has a glass liner for the injection port, which must be replaced frequently to prevent contamination of the port with nonvolatile fractions of sample.

The instrument may be equipped with an integrator to determine the concentration of unknown in the sample.

The determination is conducted under the following conditions:

| | |
|---|---|
| Injection port temperature | 280° C. |
| Thermal conductivity detector setting | 320° C. @150 milliamperes |
| Carrier gas & gas flow | Helium @30 cubic centimeters per minute |
| Sample size | 10 microliters |
| Internal Standard | Dimethyl ether of triethylene glycol |

The procedure is standardized by first preparing three standard solutions containing, respectively, 2%, 5% and 10%, by weight, of purified OCE in THF. A sample of each standard solution is then prepared by measuring into a sample bottle 1.00 gram of the standard solution, 0.10 gram of the dimethyl ether of triethylene glycol and 10 ml of reagent grade toluene, and then shaking the bottle. Duplicates of each sample are injected in turn into the chromatograph, which is then run under the previously mentioned conditions.

The response factor (RF) of the determination is then calculated for each sample according to the equation $$RF = \frac{(\%OCE \text{ in standard})(\text{area \% of internal standard}) \times (\text{weight of standard solution})}{(\text{area \% of } OCE)(\text{weight of internal standard})(100)}$$

Average response factor, $RF_a$, is found by averaging the six response factors thus calculated.

The determination of OCE content is carried out by first preparing a sample of THF/AO polymerizate of unknown OCE content by measuring into a sample bottle 1.00 gram of solvent-free polymerizate, 0.10 gram of internal standard and 10 ml of reagent grade toluene, and then shaking the bottle. The sample is then injected into the chromatograph which is then run under the previously mentioned conditions. OCE content is calculated from the results according to the equation $$\text{Weight percent of } OCE = \frac{\text{area \% of } OCE}{\text{area \% of internal standard}} \times 10\, RF_a$$

Purified OCE is obtained by first distilling a raw THF/AO polymerizate (the AO being the same as that in the copolymer of the unknown) in a 5.08 cm (2-inch) Pope wiped film molecular still, sold by Pope Scientific, Inc., Menomonee Falls, Wisconsin. The distillation is carried out at 170°–190° C. and a pressure of less than about 26 Pa (0.2 mm of mercury), with an input rate of about 1 drop per second.

Two hundred parts by weight of the distillate are mixed with 60 parts by weight of 2,4-toluene diisocyanate and 3 drops of dibutyltin dilaurate and the mixture held at ambient temperature, with stirring, until the exothermic reaction subsides. The mixture is then held at 100° C. for two hours, with stirring, and its free isocyanate content determined by titration with di-n-butylamine, as described in Analytical Chemistry of the Polyurethanes, Volume XVI, Part III, D. J. David and R. B. Staley, Wiley-Interscience, 1969, pages 357–359. Enough ethylene glycol to give an isocyanate/hydroxyl mole ratio of about 1/1 is added to the mixture, which is then brought to 100° C. and held there for two hours, with stirring, to complete conversion to a polyurethane.

The resulting mixture containing the inert OCE is then extracted with diethyl ether and the extract concentrated on a rotary evaporater at 100° C. and a pressure of about 1333 Pa (10 mm of mercury). The concentrate is then distilled in the Pope molecular still at 170°–190° C. and a pressure of less than about 26 Pa (0.2 mm of mercury) and an input rate of about 1 drop per second. The distillate is purified OCE.

After the OCE content of a polymerizate has been reduced according to the invention, the polymerizate can be used for whatever purpose intended, without further processing or treatment.

EXAMPLE 1 (Best Mode)

One hundred grams of a THF/EO polymerizate containing 8% by weight of oligomeric cyclic ethers were charged to an autoclave. The polymerizate was heated to and held at 100° C. Propylene was then pumped into the autoclave to a pressure of 8274 kPa gauge (1200 psig). When the temperature and pressure had stabilized at 100° C. and the pressure had stabilized at 8274 kPa with a gas feed of 10 grams/minute, propylene gas was released from the autoclave through a short coil, where the pressure was dropped to atmospheric. The release rate was adjusted so that it balanced the input rate of 10 grams/minute.

Oligomeric cyclic ethers released from the gas were collected in a vessel and the gas was vented to the atmosphere. The polymerizate in the autoclave was found to contain 2%, by weight, of oligomeric cyclic ethers.

The polymerizates listed in the following table were treated in like fashion, under the conditions and with the results shown:

| Polymerizate | Initial OCE Content | Gas | Temp. °C. | Pressure kPa | Final OCE Content |
|---|---|---|---|---|---|
| THF/PO | 8% | ethylene | 45 | 6895 | 2% |
| THF | 1% | propylene | 105 | 10342 | 0.2% |

-continued

| Polymerizate | Initial OCE Content | Gas | Temp. °C. | Pressure kPa | Final OCE Content |
|---|---|---|---|---|---|
| EO | 8% | ethylene | 20 | 6895 | 4.6% |

I claim:
1. A method for reducing the oligomeric cyclic ether content of a tetrahydrofuran-, an alkylene oxide-, or a tetrahydrofuran/alkylene oxide polymerizate, the method comprising
   (a) bringing the polymerizate into contact with a gas in the supercritical state, for a time sufficient to reduce said ether content, the gas having a critical temperature of 0°–200° C., and then
   (b) separating the gas and the polymerizate.
2. The method of claim 1 in which the gas used has a critical temperature of 9°–155° C.
3. The method of claim 1 in which the gas is used at a temperature which is no more than 50° C. above its critical temperature.
4. The method of claim 1 in which the gas is used at a temperature which is no more than 20° C. above its critical temperature.
5. The method of claim 1 in which the gas is a saturated- or monoethylenically unsaturated hydrocarbon, a halogenated hydrocarbon, carbon dioxide, dimethyl ether or diethyl ether.
6. The method of claim 5 in which the gas is ethylene or propylene.
7. A method for separating a tetrahydrofuran-, an alkylene oxide- or a tetrahydrofuran/alkylene oxide polymerizate and oligomeric cyclic ethers contained therein, the method comprising removing ethers from the polymerizate according to the method of claim 1, then releasing the gas from the supercritical state and collecting the thus separated ethers.
8. A method for reducing the oligomeric cyclic ether content of a tetrahydrofuran/ethylene oxide- or a tetrahydrofuran/propylene oxide polymerizate, the method comprising bringing the polymerizate into contact with propylene in the supercritical state, for a time sufficient to reduce the ether content, and then separating the propylene and the polymerizate.
9. The method of claims 1, 2 or 3–8 in which the gas or the polymerizate contains an entrainer.
10. The method of claim 9 in which the entrainer is toluene.

* * * * *